(12) United States Patent
Loew et al.

(10) Patent No.: US 8,919,506 B2
(45) Date of Patent: Dec. 30, 2014

(54) VIBRATION ABSORBER

(75) Inventors: Johann Loew, Garching (DE); Franz Kobus, Jettenbach (DE)

(73) Assignee: SGF Sueddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 167 days.

(21) Appl. No.: 13/580,080

(22) PCT Filed: Feb. 21, 2011

(86) PCT No.: PCT/EP2011/000824
§ 371 (c)(1),
(2), (4) Date: Oct. 15, 2012

(87) PCT Pub. No.: WO2011/101169
PCT Pub. Date: Aug. 25, 2011

(65) Prior Publication Data
US 2013/0126285 A1    May 23, 2013

(30) Foreign Application Priority Data
Feb. 22, 2010    (DE) .......................... 10 2010 008 760

(51) Int. Cl.
F16F 7/10    (2006.01)
F16F 7/104   (2006.01)
F16F 15/14   (2006.01)

(52) U.S. Cl.
CPC ............. *F16F 7/104* (2013.01); *F16F 15/1442* (2013.01); *F16F 15/1414* (2013.01)
USPC ........... 188/379; 464/89; 464/180; 267/141.1

(58) Field of Classification Search
USPC ............ 74/574.4; 188/379; 267/140.4, 141.1, 267/141.2; 464/89, 180
See application file for complete search history.

(56) References Cited

U.S. PATENT DOCUMENTS 4,077,233 A * 3/1978 Hornig et al. ............. 464/89
4,516,955 A * 5/1985 Worner et al. ............ 464/89

(Continued)

FOREIGN PATENT DOCUMENTS

DE    36 38 209 A1    5/1988
DE    43 07 583 C1   12/1993

(Continued)

OTHER PUBLICATIONS

International Search Report for corresponding application No. PCT/EP2011/000824 mailed May 31, 2011.

*Primary Examiner* — Christopher Schwartz
(74) *Attorney, Agent, or Firm* — Carter, Deluca, Farrell & Schmidt LLP

(57) ABSTRACT

The present disclosure relates to a vibration absorber for a drive train of a motor vehicle, including an internal carrier which can be rotated around a rotation axis, a mass ring which is coaxial to the internal carrier and which is arranged at a radial distance from the internal carrier, and a plurality of spring elements which connect the internal carrier and the mass ring to each other. The mass ring has at least one radial profile formation on the inner circumferential surface thereof to provide sliding support in the circumferential direction and is provided with an elastomeric damping layer arranged between the internal carrier and the mass ring, the layer being designed such that the mass ring slides at least in the region of the at least one radial profile formation thereof in the circumferential direction on the internal carrier during a relative rotation.

19 Claims, 11 Drawing Sheets

(56) References Cited

U.S. PATENT DOCUMENTS

| | | | |
|---|---|---|---|
| 5,328,408 A | | 7/1994 | Wolf et al. |
| 5,352,157 A | * | 10/1994 | Ochs et al. ............ 464/89 |
| 5,377,962 A | * | 1/1995 | Ochs et al. ............ 267/281 |
| 6,308,810 B1 | * | 10/2001 | Kuwayama ............ 188/379 |
| 6,702,681 B1 | * | 3/2004 | Ochs ............ 464/90 |
| 6,883,653 B2 | | 4/2005 | Kato et al. |

FOREIGN PATENT DOCUMENTS

| | | |
|---|---|---|
| DE | 4328613 A1 | 3/1995 |
| DE | 44 30 036 C1 | 8/1995 |
| DE | 10 2007 030 557 B3 | 11/2008 |
| DE | 102008027404 A1 | 12/2009 |
| EP | 0 250 913 A2 | 1/1988 |
| EP | 0 403 725 A1 | 12/1990 |

\* cited by examiner

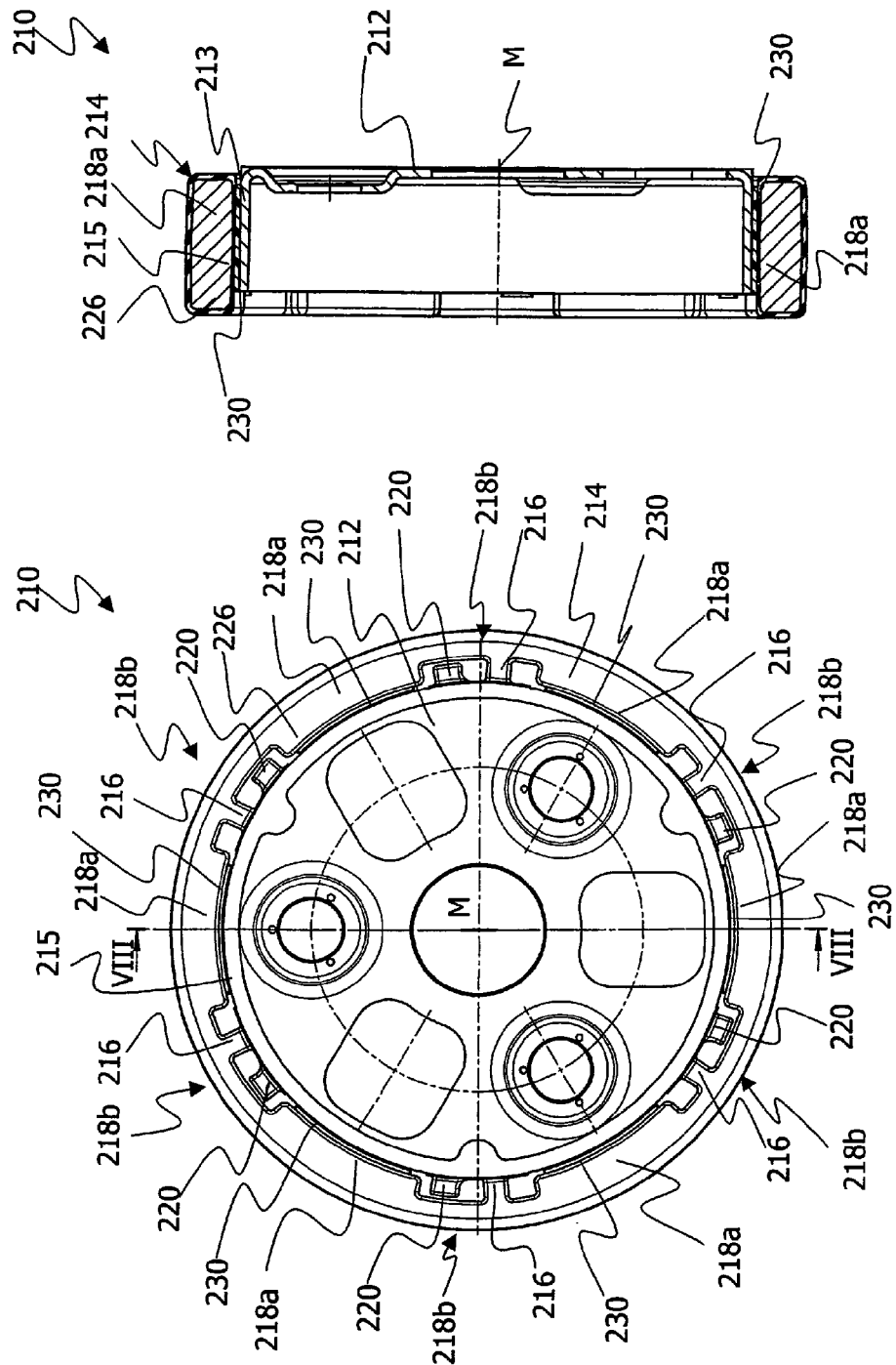

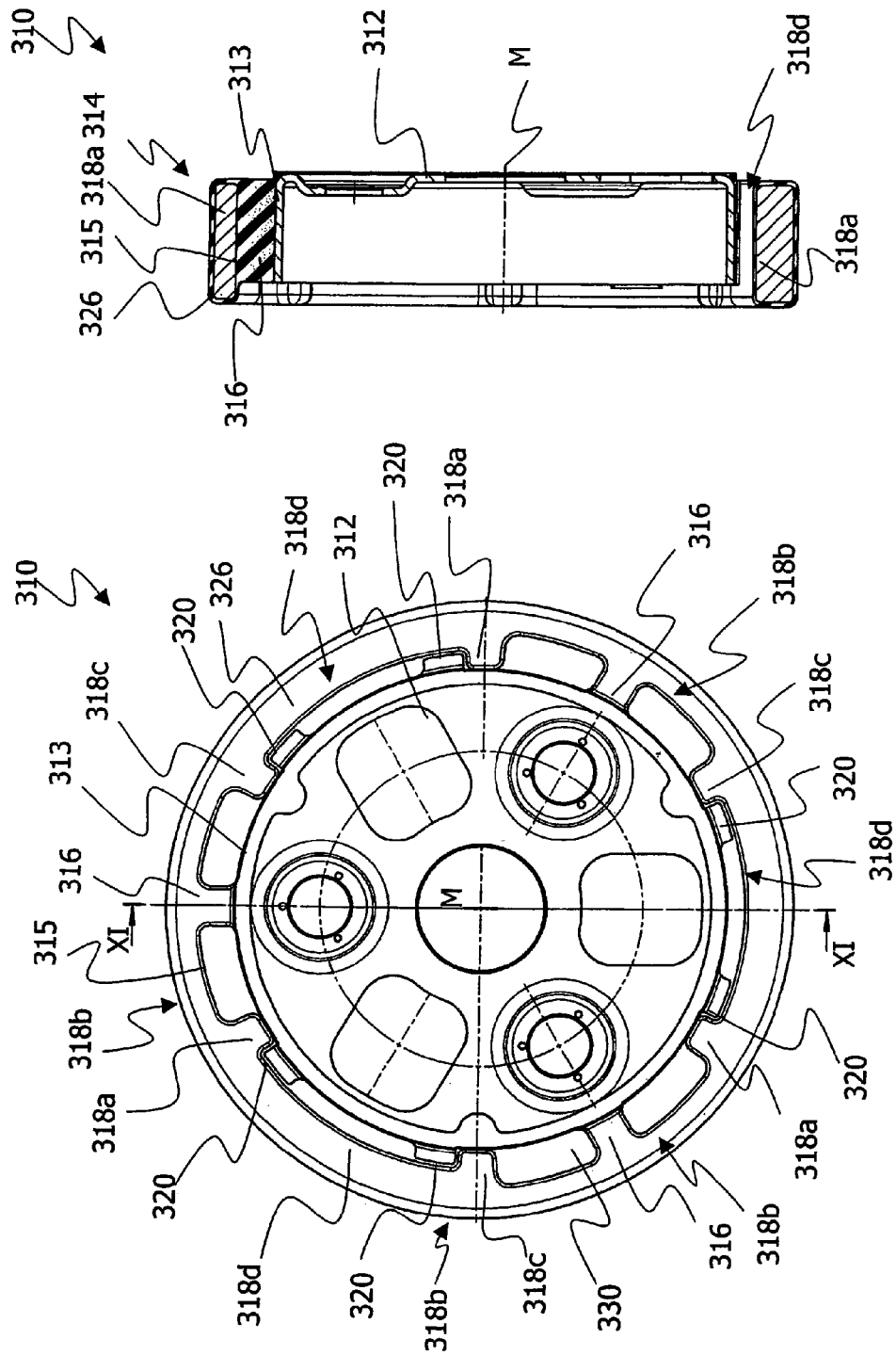

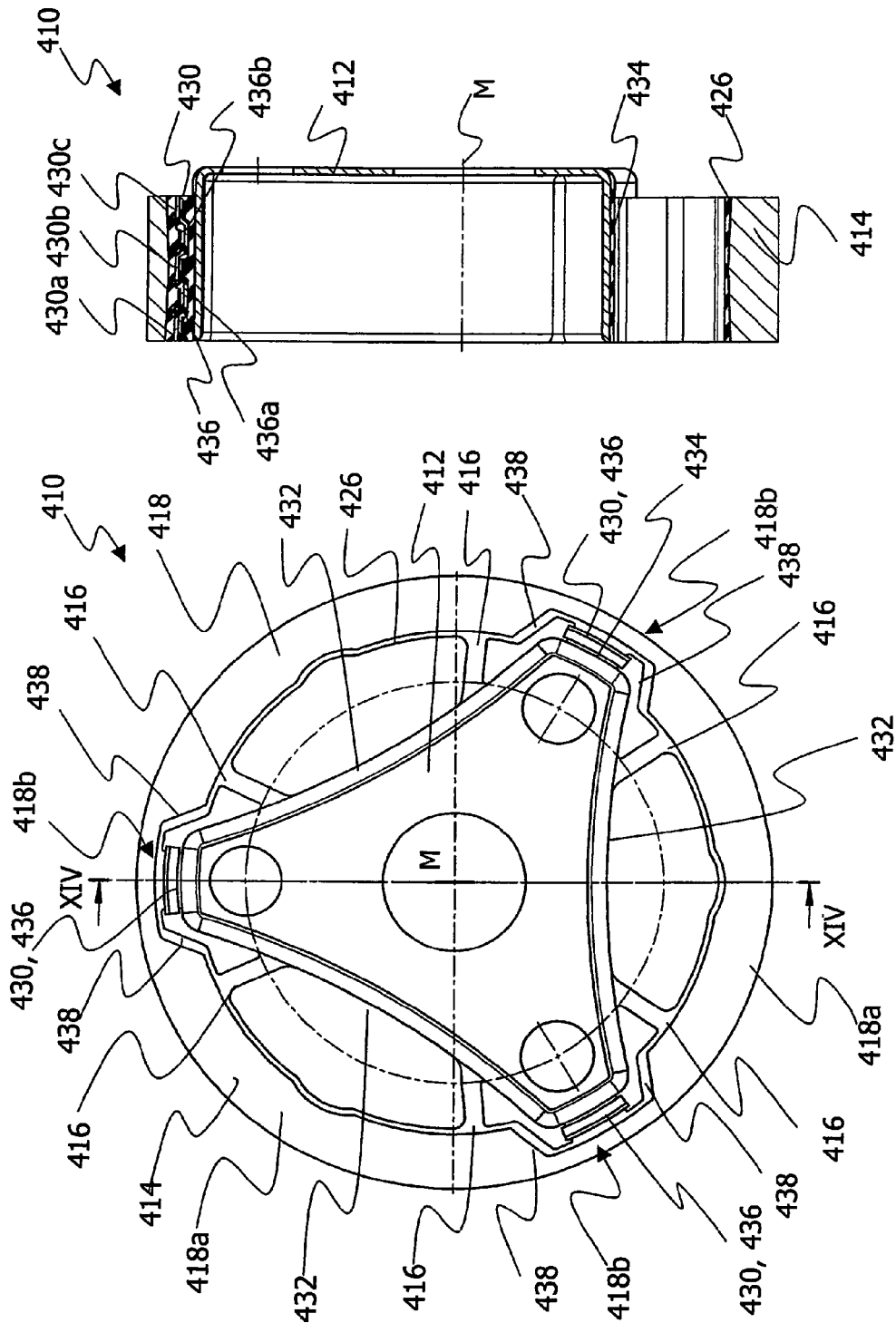

VIBRATION ABSORBER

The present invention relates to a vibration absorber, in particular for a drive train of a motor vehicle, having an inner carrier which is rotatable about an axis of rotation, a mass ring which is substantially coaxial with the inner carrier and is arranged at a radial distance from the inner carrier, and a plurality of spring elements which connect the inner carrier and the mass ring to one another.

Such vibration absorbers are known from the prior art, such as for example from the document DE 43 07 583 C1. For radial support of the mass ring, various solution approaches are shown in the prior art. Thus, document DE 43 07 583 C1 discloses a torsional vibration absorber having a carrying body and an inertia ring, which are connected to one another via six elastic segments. The segments are composed of rubber and are vulcanised onto an inner circumferential surface of the inertia ring and onto an outer circumferential surface of the carrying body. Three mounts composed of rubber are vulcanised onto the outer circumferential surface of the carrying body. A sliding body made of a hard-elastic material is axially inserted into each of the mounts. The sliding bodies have a sliding surface, by which they lie partially on the inner circumferential surface of the inertia ring. The sliding bodies are furthermore designed in the form of a bridge with a bridge arch and two bridge supports. The bridge supports are received in the mounts, an interspace being provided between the bridge supports and the mounts, which is closed on radial loading of the torsional vibration absorber. Furthermore, a lubricant channel is formed between the bridge arch and the mounts.

The document DE 44 30 036 C1 describes a torsional vibration absorber with sliding blocks for radial support, each of the blocks being arranged in an interspace between a pair of mounts and having a filling.

The torsional vibration absorbers known from the prior art have a relatively complex structure or a complex geometry especially with regard to the sliding block/mount arrangements, such as for example in the sliding block/mount arrangements according to DE 43 07 583 C1 with the bridge shape of the sliding blocks and with the mounts, and the interspace formed therebetween.

Also known from the prior art are solutions in which such sliding blocks or sliding bodies are dispensed with and instead the elastomeric spring elements are modified to enable radial support of the mass ring on the inner carrier. Thus, the document DE 42 01 049 A1 shows a rotational-speed-adaptive torsional vibration damper, in which a mass ring and an inner carrier are connected or connectable to one another, rotational-speed-independently, by column-shaped first spring elements made of rubber which are uniformly distributed between them and, rotational-speed-dependently, by second spring elements made of rubber. The second group of spring elements is expanded radially outwards upon introduction of high centrifugal forces and in this way comes into engagement with the mass ring or with stop surfaces arranged on the inner circumferential surface. A similar torsional vibration absorber is known from the document DE 36 38 209 A1.

The document DE 41 21 746 A1 discloses a torsional vibration absorber, in which the inner carrier and the mass ring are achieved via two to six axially oriented connecting webs made of rubber-elastic material which have in the axial direction the outer contour of a radially oriented and tangentially constricting "X". Provided between the connecting webs, which are distributed with equal angular distances from one another, are buffer webs, which form a comparatively narrow separating curved gap maintaining the spacing relative to the adjacent connecting webs and to the free circumferential surface of the hub ring.

A dynamic damper, which is directly fitted onto a rotating shaft, is known from the document U.S. Pat. No. 6,883,653 B2. In the case of this damper, a rubber sleeve which is press-fitted like a shrink sleeve onto the shaft to be connected is provided. A mass ring is embedded in the elastic element coaxially with the shaft to be damped and at a distance from the shaft. The rubber-elastic element comprises a tubular section which after its mounting encompasses the shaft to be damped, a covering section which covers the mass ring and coaxially surrounds the tubular section, and connecting webs connecting these sections. Additionally formed between the connecting webs are stoppers made of rubber-elastic material which limit the relative movement of the inner carrier with respect to the mass ring in the radial direction.

Finally, the document DE 10 2007 030 557 B3 shows a torsional vibration absorber, in which the mass ring does not surround the inner carrier, but is arranged axially offset therefrom. Axially arranged elastomer spring regions are formed between the inner carrier and the mass ring. The mass ring has correspondingly recess regions in the axial direction, in which regions are arranged elastomer springs which connect the inner carrier and the mass ring to one another in the axial direction. In addition, for radial support of the absorber mass, the inner carrier has radial guide surfaces curved inwards. Thus, the elastomer springs connect the inner carrier and the mass ring axially to one another, while an elastomer material between the radial guide surfaces and the mass ring is vulcanised only onto the mass ring.

A common aspect of these solutions is that the absorbers have to be produced as accurately as possible and comparatively small tolerances chosen, in order for the absorbers to function in the desired manner. This involves considerable complexity during manufacture, which also results in increased manufacturing costs.

It is an object of the present invention to provide a vibration absorber of the kind described at the outset, which can meet the requirements for vibration damping with a simple structure.

This object is achieved with a vibration absorber of the kind described at the outset, in which the mass ring has on its inner circumferential surface at least one radial profile formation for sliding support in the circumferential direction, and the mass ring comprising an elastomeric damping layer arranged between the inner ring and the mass ring, which layer is designed such that the damping layer slides at least in the region of the at least one radial profile formation in the circumferential direction on the inner carrier upon a relative rotation between the mass ring and the inner carrier.

With the aid of the spring elements, in principle a relative rotation by a predetermined amount between the mass ring and the inner carrier for the damping of torsional vibrations is made possible. Through the arrangement of the radial profile formations and the elastomeric damping layer, the mass ring can be radially supported on the inner carrier and at the same time slide on the inner carrier with damping of torsional vibrations, upon a relative rotation between the mass ring and the inner carrier which occurs during operation. In other words, owing to its mass moment of inertia, the mass ring vibrates in phase opposition to the inner carrier and a shaft connected to the inner carrier, in order to be able to damp torsional vibrations which occur.

The torsional vibration absorber according to the invention achieves improved torsional vibration damping properties with a significantly simplified structure and production process compared with the prior art, since the radial profile formations and the elastomeric damping layer guide the mass ring—in contrast to the prior art—in the radial direction and thus the entire torsional vibration absorber is significantly stiffened in the radial direction. In other words, via the radial support of the mass ring on the inner carrier by means of the radial profile formations, an undesired radial displacement of the mass ring relative to the axis of rotation of the torsional vibration absorber is prevented, since the mass ring is radially supported on the inner carrier via its radial profile formations and the elastomeric damping layer. Vibrations which occur in the radial direction and are caused, for example, by non-uniformity of the rotary movement of a shaft connected to the vibration absorber can, however, be damped via the elastomeric damping layer.

With the radial support of the mass ring on the inner carrier achieved by the radial profile formations, in addition an improved tunability of the torsional vibration absorber to different cases of application, i.e. shafts or drive trains of different dimensions, is achieved, since a sufficient radial guidance of the mass ring is guaranteed even with rubber pads of very thin design or when using very soft rubber compounds.

Furthermore, forming the mass ring with the radial profile formations has the advantage that the radial profile formations additionally increase the mass moment of inertia of the mass ring and come nearer to the axis of rotation of the torsional vibration absorber in the radial direction, with the result that the required maximum outer diameter of the mass ring can be reduced compared with conventional tubular mass rings.

Preferably, the at least one radial profile formation of the mass ring extends in the direction of the inner carrier and is formed integrally therewith. As a result, the mass ring can be produced with a simple and cost-effective production process, e.g. a casting or forging process, without a finishing of the mass ring being necessary subsequently.

According to one embodiment of the invention, the inner carrier has a sliding surface, on which the damping layer of the mass ring lies. In such an embodiment, the radial profile formations are coated, for example, with an adhesive agent, while the corresponding sliding surfaces of the inner carrier are left untreated, so that the damping layer does not adhere to the inner carrier. Since the elastomeric damping layer is not attached to the inner carrier in the region of the radial profile formations of the mass ring, the mass ring can rotate relative to the inner carrier, which is necessary for the torsional vibration damping. In other words, owing to its mass moment of inertia, the mass ring slides upon a relative rotation firstly on the inner carrier, so that the mass ring vibrates at a phase-shifted frequency which can compensate the vibrating frequency of the shaft connected to the inner carrier. The sliding surface of the inner carrier can additionally be of smooth-turned and/or polished form, in order to provide particularly good sliding properties.

Alternatively, however, it can also be provided that the damping layer is fastened to the inner carrier and the radial profile formations have a sliding surface, on which the damping layer lies.

In certain cases of application, it may be advantageous to provide sliding bodies for further improvement of the radial support. In this case, each radial profile formation can be additionally assigned a sliding body which is fastened to the radial profile formation by means of the damping layer and lies on a sliding surface of the inner carrier. In this design variant too, it is conceivable that the sliding bodies are fastened to the inner carrier together with the damping layer, and the radial profile formation have a sliding surface on which the sliding bodies lie.

According to a further embodiment of the invention, it can be provided that a radial profile formation of the mass ring comprises at least one recess. With radial profile formations designed in this manner, the vibration absorber according to the invention can be tuned to specific areas of application, i.e. the radial profile formations can be formed in such a manner that they cooperate with corresponding profile formations or stop bodies on the inner carrier, in order for example to allow only very small amplitudes of the mass ring relative to the inner carrier.

It can further be provided that the damping layer completely surrounds the mass ring. In such an embodiment, the damping layer forms as it were a coating which is vulcanised onto the mass ring, resulting in a significant simplification of the production process of the mass ring. Thus, the mass ring in such an embodiment can be formed with its radial profile formations as a cast or forged part which no longer requires any special finishing prior to the vulcanising process.

Alternatively, the mass ring can be produced with its radial profile formations by employing a different production process, such as sintering, extrusion or the like. If a mass ring is subjected, for example, to a finishing by machining after it has been produced by one of the aforementioned production processes, a complete surrounding of the mass ring with the elastomeric damping layer is no longer necessary. In other words, the elastomeric damping layer can be pressed onto the end faces of the mass ring, thereby saving material.

The spring elements for connecting the inner carrier to the mass ring can be formed from an elastic material and connect the inner carrier to the mass ring in a web-like manner. In this case, the spring elements can extend substantially in the radial direction. In order to further simplify the production of the vibration absorber, it can be provided that the damping layer is formed integrally with the spring elements. In such an embodiment, the mass ring can be inserted together with the inner carrier into a vulcanising mould and be completely overmoulded with rubber. Only the contours of the spring elements are shaped by the vulcanising mould, otherwise the entire region between the mass ring and the inner carrier is filled with rubber-elastic material. In the regions in which a fastening of the spring elements to the inner carrier and to the mass ring and of the damping layer to the mass ring or the inner carrier is to take place, these regions are coated with adhesive agent, so as to form regions in which there is rubber adhesion. In the other regions, therefore, there is no adhesion of the elastomer material to the respective metal part, thereby enabling the sliding movement of the mass ring on the inner carrier.

Furthermore, there can be provided, at least on the outer circumferential surface of the inner carrier, at least one stop body projecting radially outwards from this outer circumferential surface, in particular a plurality of stop bodies being arranged at regular angular distances about the axis of rotation. In a development of the invention, the stop bodies can cooperate with the radial profile formations provided on the inner circumferential surface of the mass ring, in order to limit the rotation of the mass ring relative to the inner carrier. In this way, the relative rotation of the mass ring relative to the inner carrier about the axis of rotation is limited.

The radial profile formations can be offset from one another by a predetermined angle with respect to the axis of rotation of the vibration absorber, in particular at an angle between 60° and 120°.

Furthermore, the spring elements can likewise be offset from one another by a predetermined angle with respect to the axis of rotation of the vibration absorber, in particular at an angle between 30° and 90°.

According to a further preferred embodiment, the inner carrier has, at least in sections, an elastomeric damping layer. In order to continue to allow a relative rotation between the inner carrier and the mass ring of the vibration absorber in this embodiment too, it can furthermore be provided that the inner carrier has at least one sliding body which is fastened to the inner carrier by means of the damping layer. In this case, the sliding body can be arranged in such a manner on the inner carrier that it is in engagement with the sliding body on the at least one radial profile formation of the mass ring. In other words, upon a relative rotation between the inner carrier and the mass ring, the sliding bodies of the mass ring and of the inner carrier slide on one another, so that a direct contact between the elastomeric damping layer and the sliding surface is avoided, in order to guarantee even at very high rotational speeds a sufficient radial support which prevents unbalances due to a deflection of the mass ring relative to the axis of rotation of the vibration absorber.

In this context, the sliding bodies of the mass ring and of the inner carrier can be provided with guideways running in the circumferential direction of the vibration absorber. Preferably, the guideways of the sliding bodies of the mass ring and of the inner carrier are formed correspondingly to one another and engage in one another, whereby an axial guidance of the mass ring is also achieved. Through such a design of the sliding blocks on the mass ring and the inner carrier, the axial resonant frequency and the torsional resonant frequency of the vibration absorber can be decoupled from one another, i.e. be tuned independently of one another. In other words, through the corresponding sliding bodies on the mass ring and the inner carrier, the degree of freedom in the axial direction of the mass ring can be separately eliminated, thereby enabling a torsional vibration damping tuning of the absorber which is largely independent of axial deflections of the mass ring.

The invention furthermore relates to a drive train for a motor vehicle having a vibration absorber with the above-mentioned features.

The invention is explained by way of example below with reference to the appended figures, in which:

FIG. 8 shows a front view of the third embodiment of the invention;

FIG. 9 shows a sectional view of the third embodiment of the invention;

FIG. 11 shows a front view of the fourth embodiment of the invention;

FIG. 12 shows a sectional view of the fourth embodiment of the invention;

FIG. 14 shows a front view of the fifth embodiment of the invention;

FIG. 15 shows a sectional view of the fifth embodiment of the invention; and

Figure 16B:
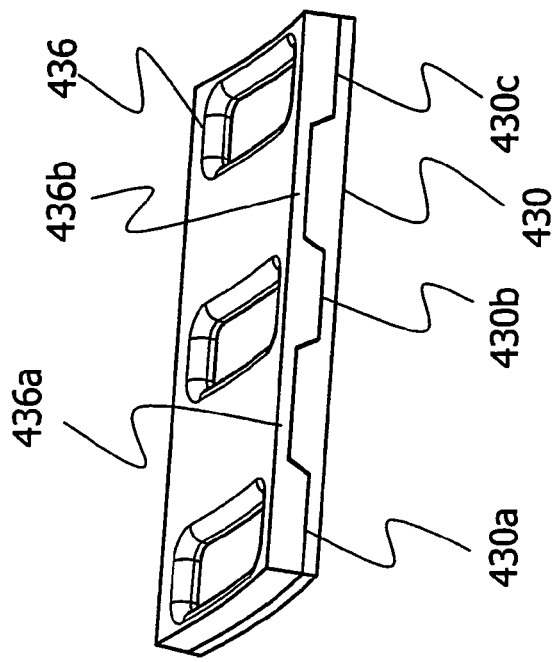
Figure 16A:
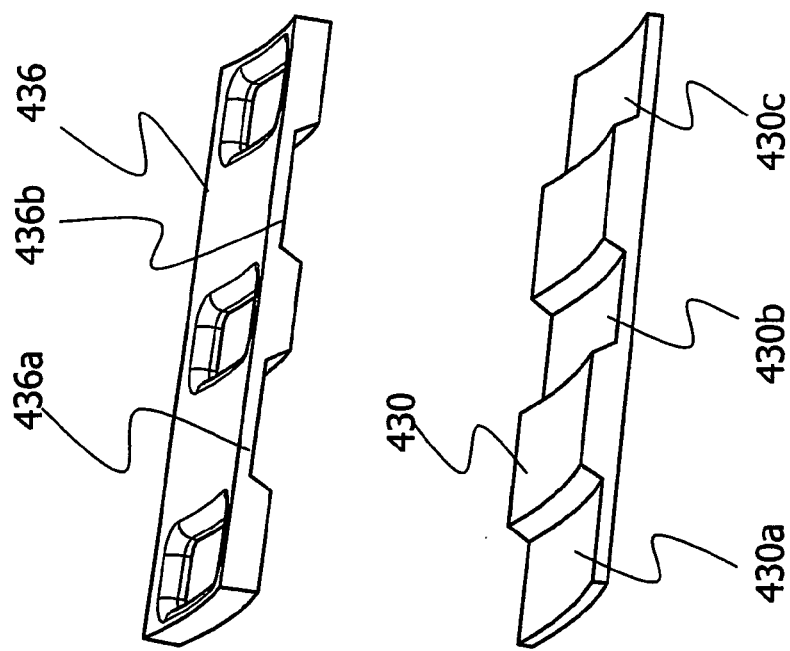

FIGS. 16a, b show views of a sliding body according to the fifth embodiment of the invention.

Figure 1:
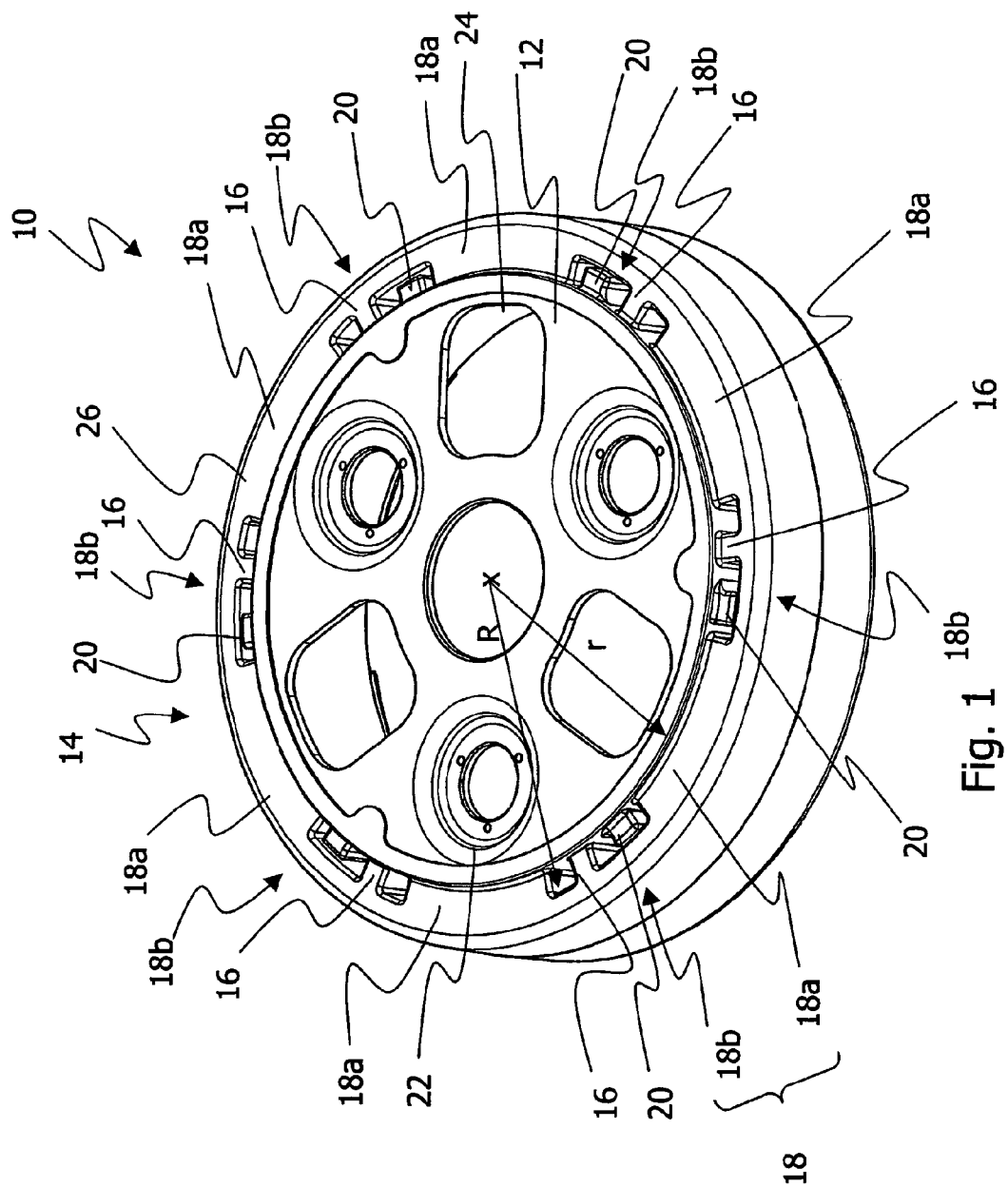
FIG. 1 shows a perspective view of a vibration absorber according to a first embodiment of the invention.

FIG. 1 shows a perspective view of a vibration absorber according to a first embodiment of the invention, the vibration absorber being designated generally by 10.

The vibration absorber 10 has an inner carrier 12, radially spaced about which is arranged a coaxial mass ring 14. The inner carrier 12 and the mass ring 14 are connected to one another via radially running spring elements 16 made of an elastomer. From FIG. 1 there can be seen radial profile formations 18 on the inner circumferential surface 15 of the mass ring 14. A radial profile formation 18 in this context is to be understood as a circular ring section of the mass ring 14, in which the mass ring 14 changes its inner radius at least once, i.e. jumps from its smallest inner radius r to its largest inner radius R. In other words, a radial profile formation 18 in the torsional vibration absorber 10 according to the first embodiment is composed of a radial section 18a and a recess 18b, in which in this embodiment the elastomeric spring elements 16 are arranged. To maintain the clarity of the illustration, in FIG. 1 only one radial profile formation 18 is provided with reference symbols.

Besides the spring elements 16, a stop body 20 attached to the inner carrier 1 is also arranged in the recess 18b, which body limits a relative rotation of the mass ring 14 relative to the inner carrier 12 with a rubber-elastic deformation of the spring elements 16. The mass ring 14 can rotate by a predetermined amount relative to the inner carrier 12 or slide on the inner carrier 12, before the stop bodies 20 strike against the section 18a of the radial profile formation 18 and damp and finally limit the relative rotation. In other words, a maximum permissible amplitude of the mass ring 14 relative to the inner carrier 12 can be set via the stops 20. When shocks and impacts occur during operation, the radial section 18a can lie against the stop body 20, in order to prevent damage to the torsional vibration absorber 10.

Openings 22 are provided in the inner carrier 12, in order to attach the inner carrier 12 to a shaft (not shown here), the torsional vibrations of which are to be damped. In addition, the inner carrier 12 has openings 24 which can serve as engagements for tools during the production process and also contribute to weight reduction of the vibration absorber 10 in the inner carrier 12.

Figure 2:
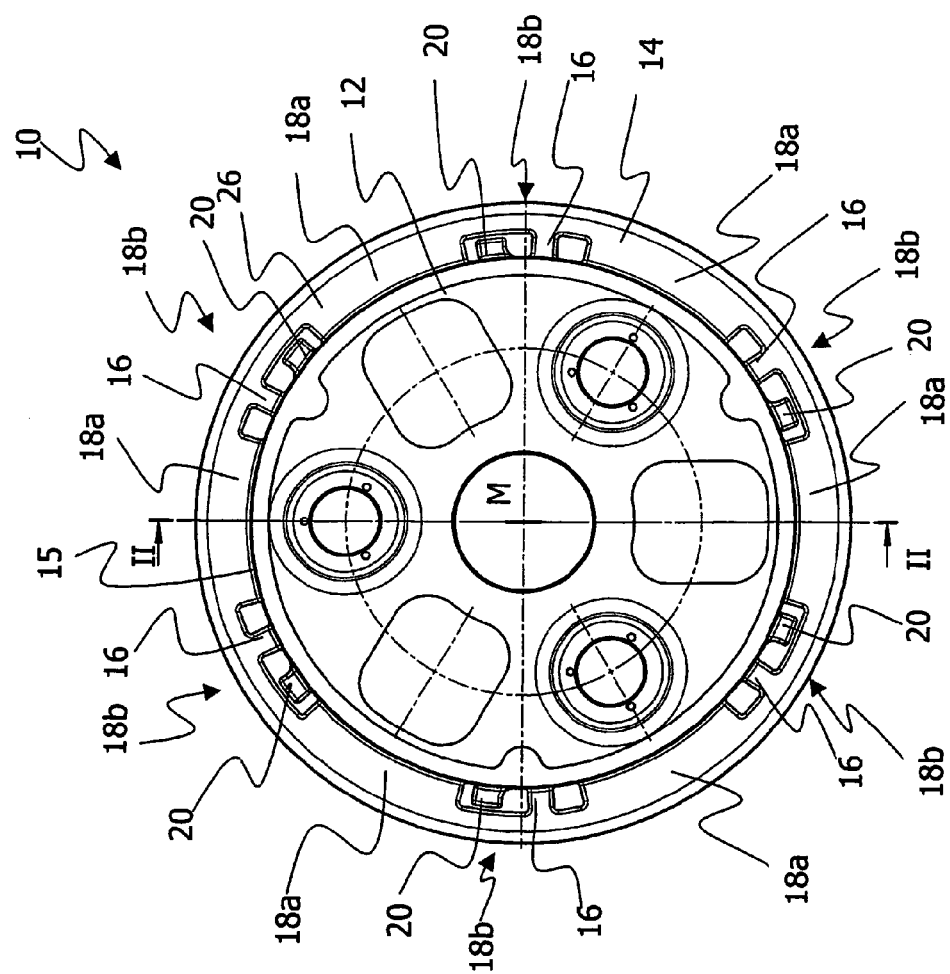
FIG. 2 shows a front view of the first embodiment of the invention.

FIG. 2 shows a front view of the vibration absorber 10 with the inner carrier 12 and the mass ring 14. From FIG. 2, the radial profile formations 18 with their radial section 18a lying on the inner carrier 12 and with the recess 18b can be seen more clearly. As already mentioned, besides the spring elements 16, the stop bodies 20 for limiting a rotation of the mass ring 14 relative to the inner carrier 12 are also arranged in the recesses 18b.

Figure 3:
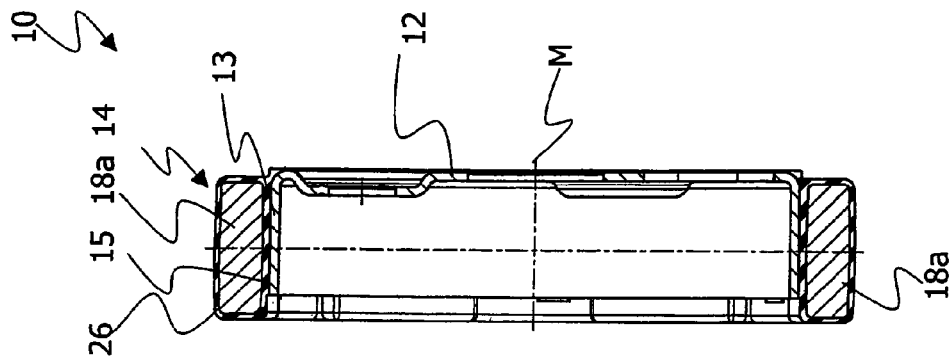
FIG. 3 shows a sectional view of the first embodiment of the invention.

FIG. 3 shows a sectional view along the section line II-II from FIG. 2.

On comparative viewing of FIG. 2 and FIG. 3 together, it can be seen that the mass ring 14 is completely surrounded by an elastomeric damping layer 26. In addition, the elastomeric damping layer 26 can also be designed to fill the region between the mass ring 14 and the inner carrier 12.

Furthermore, it can be seen from FIG. 2 and FIG. 3 that the radial profile formations 18 are formed integrally on the mass ring 14, i.e. the radial profile formations 18 are radial projections and recesses provided integrally on the mass ring 14.

The sections 18a of the radial profile formations 18 lie on the inner carrier 12 via the damping layer 26. In other words, the damping layer 26 is not connected to the inner carrier 12 in the region of the radially inwardly projecting radial sections 18a of the radial profile formations 18, so that the mass ring 14 can slide on the inner carrier 12 during a relative rotation during the operation of the torsional vibration absorber, at least in the region of the radial sections 18a. For this purpose, a sliding surface is formed on the outer circumferential surface 13 of the inner carrier 12 at the regions corresponding to the radial sections 18a, which sliding surface can be produced for example by finish-turning or polishing, in order to allow a relative rotation between the inner carrier 12 and the mass ring 14 with as little material wear as possible.

As can be seen from FIGS. 1 to 3, an improved radial support of the mass ring 14 on the inner carrier 12 while at the same time preserving the torsional and radial vibration damping properties of the vibration absorber 10 is achieved by the radial profile formations 18 and here in particular by the inwardly directed radial sections 18a.

Since the mass ring 14 is overmoulded with the elastomeric damping layer 26 directly after its production, for example, by continuous casting or forging, no finishing of the mass ring 14 by machining is required, with the result that the production process of the vibration absorber 10 can be kept relatively simple. The elastomeric damping layer 26 can also be formed integrally with the stop bodies 20 provided in the recesses 18b and the spring elements 16. The spring elements 16 and the stop bodies 20 are in this case arranged in regions in which the elastomeric damping layer 26 is firmly connected to the inner carrier 12. As a result, a particularly simple production process of the vibration absorber 10 is achieved, since the mass ring 14 and the inner carrier 12 are inserted together into a vulcanising mould and also the region between the inner carrier 12 and the mass ring 14 is overmoulded with the elastomeric damping layer 26. Only the contours of the spring elements 16 and the stop bodies 20 are shaped by the vulcanising mould.

As can be seen from FIG. 2, the radial sections 18a and the recesses 18b are arranged offset from one another at regular angular distances, in FIG. 2 by 60° in each case, in order to prevent unbalance phenomena in the event of vibrations which occur in the radial direction. The spring elements 16 are arranged offset from one another by an angle of 60° about the circumference of the vibration absorber 10. As already mentioned, a radial profile formation encloses a specific circular ring section of the mass ring 14. In this embodiment of the invention, the radial profile formations 18 extend over a circular ring section of 60°.

In order to tune the stiffness of the vibration absorber 10, it is possible to vary the thickness of the damping layer 26 on the mass ring 14 or the hardness of the elastomeric damping layer 26.

The vibration absorber 10 can also be tuned to vibration frequencies in the torsional direction via the spring elements 16. The spring elements 16 can contribute to the tuning of the vibration absorber 10, on the one hand, by their geometry and, on the other hand, via the material used. In other words, the spring elements 16 can be tuned to specific frequency ranges by the material used for them or the hardness of this material, since the amplitude of the relative rotation of the mass ring 14 relative to the inner carrier 12 and thus also the vibration frequencies are influenced in a specific manner by the chosen material. When designing the vibration absorber 10, moreover, the maximum permissible amplitude for the frequency range to be compensated must be taken into account, since this amplitude is determined by the stop bodies 20 on the inner carrier 12 and the radial sections 18a of the mass ring 14. In other words, the maximum permissible elastic deformation of the spring elements 16 is determined by the stop bodies 20 cooperating with the radial sections 18a, in order to prevent damage to the vibration absorber 10 even when powerful impacts and shocks occur during operation.

Further embodiments of the vibration absorber according to the invention are described below. For components which have the same effect or are of the same kind, the same reference symbols are used as above, but prefixed with a consecutive numeral.

Figure 4:
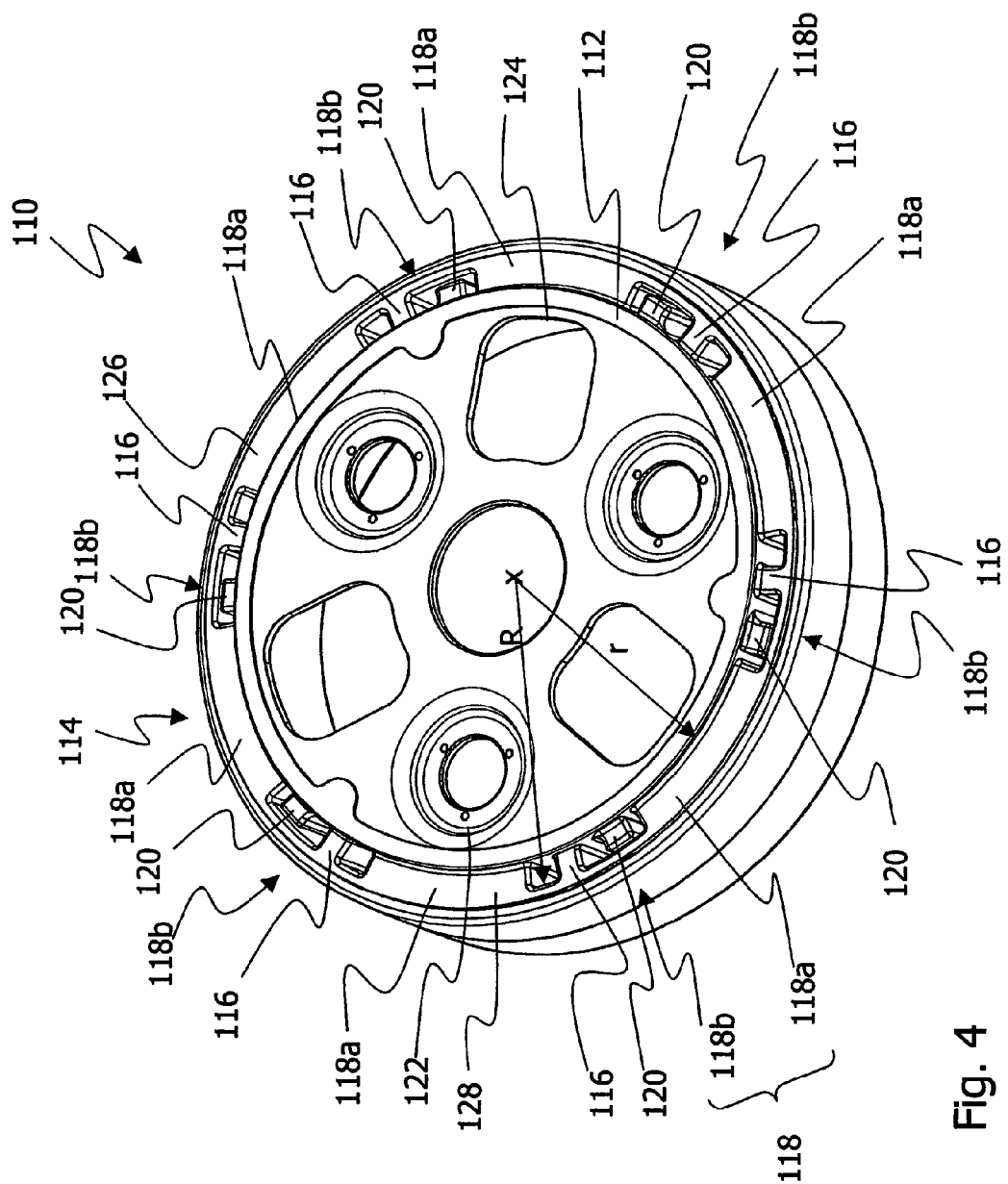
FIG. 4 shows a perspective view of a vibration absorber according to a second embodiment of the invention.
Figure 6:
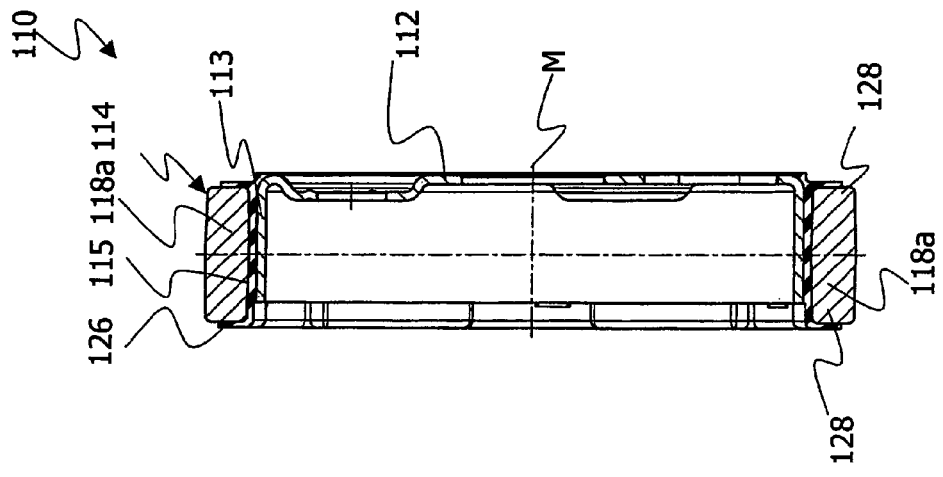
FIG. 6 shows a sectional view of the second embodiment of the invention.
Figure 5:
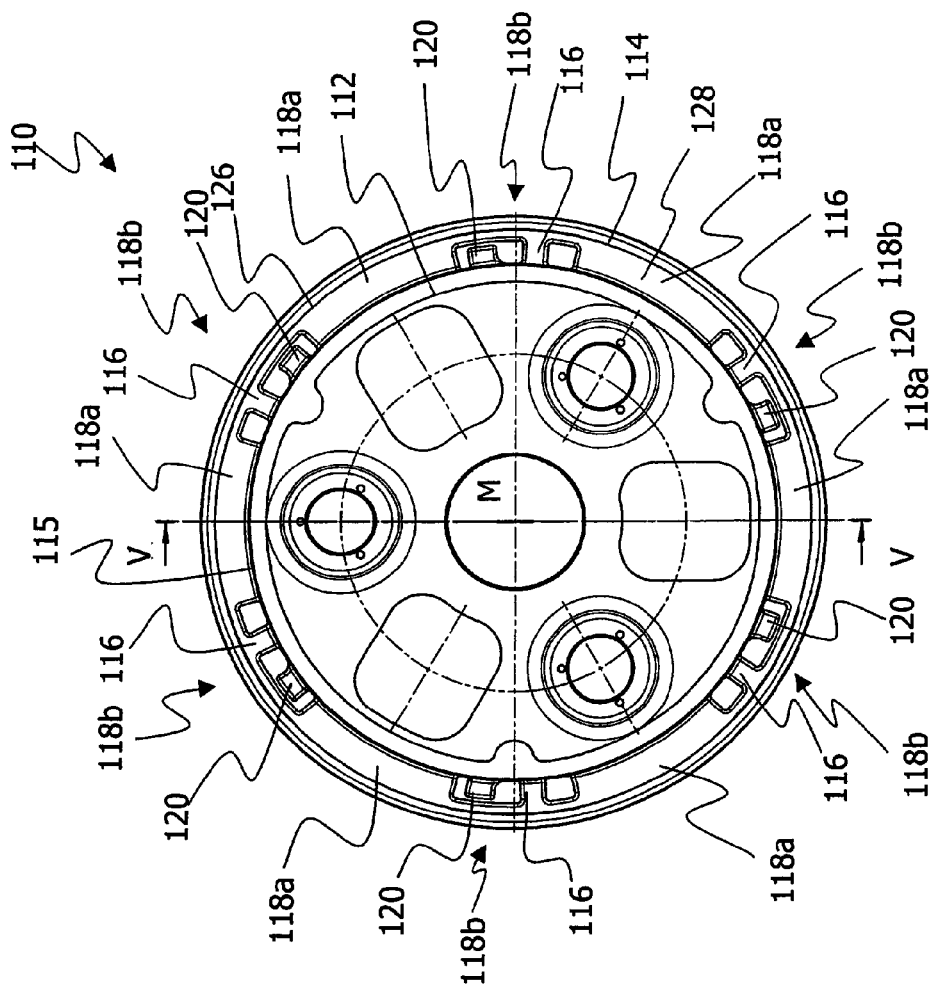
FIG. 5 shows a front view of the second embodiment of the invention.

The embodiment shown in FIGS. 4 to 6 corresponds in large parts to the embodiment according to FIGS. 1 to 3. The only difference from the embodiment according to FIGS. 1 to 3 is that the mass ring 114 of the vibration absorber 110 according to the second embodiment of the invention is not completely surrounded by an elastomeric damping layer 126, as can be seen most clearly from the sectional view according to FIG. 6.

Figure 7:
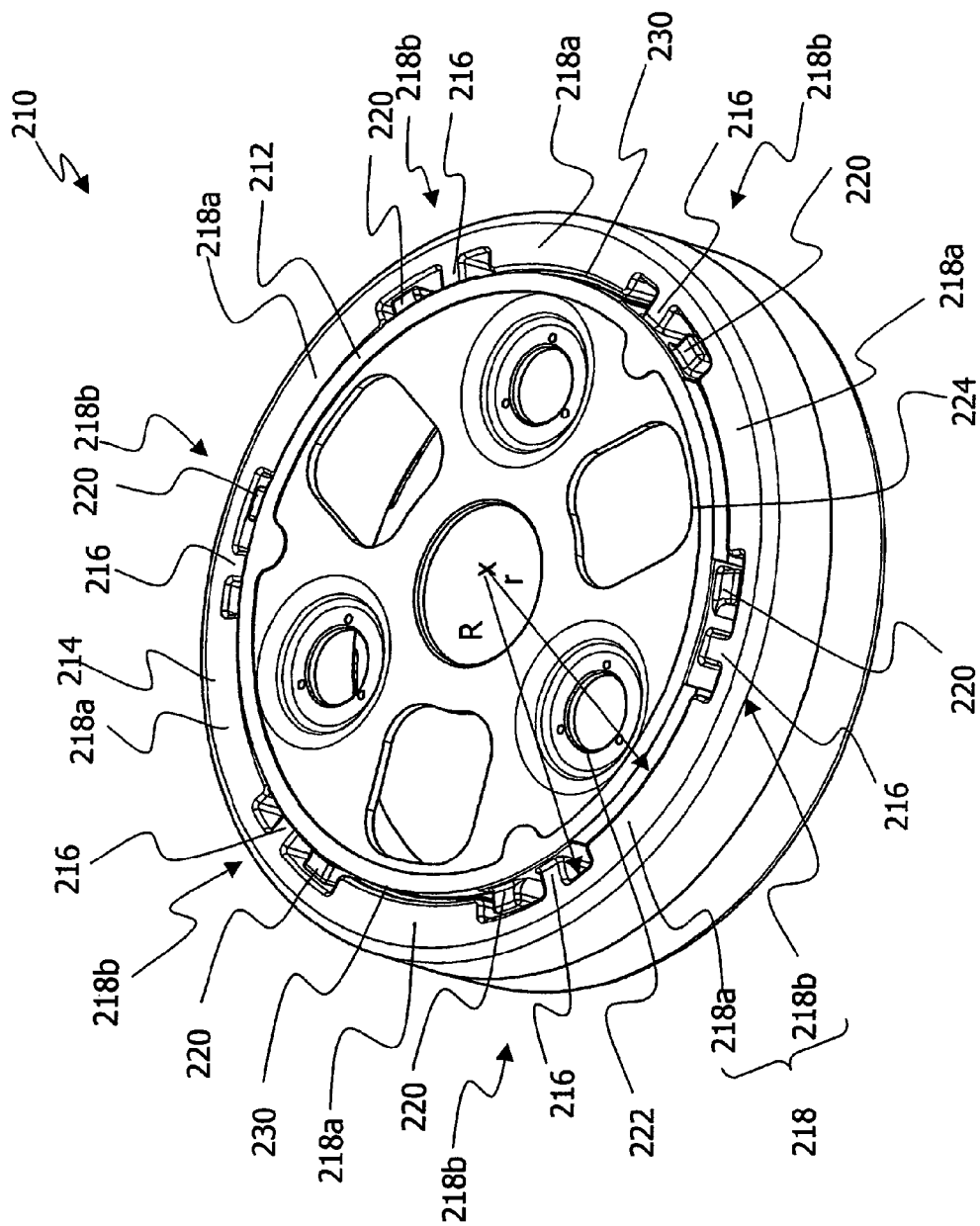
FIG. 7 shows a perspective view of a vibration absorber according to a third embodiment of the invention.

The function of the vibration absorber 110 corresponds to that of the vibration absorber according to the first embodiment described with reference to FIGS. 1 to 3. A merely partial overmoulding of the mass ring 114 with the elastomeric damping layer 126 is sufficient when the mass ring 114 is produced by a production process, such as for example sand casting, continuous casting or extrusion, and subsequently subjected to a finishing by machining in order to keep to close tolerances. If a merely partial overmoulding of the mass ring 114 is sufficient, pressing edges can be provided in an injection or vulcanising mould, with which edges the rubber-elastic damping layer can be pressed onto the end faces 128 of the mass ring 114. With reference to FIGS. 7 to 9, a third embodiment of the invention will now be described, the vibration absorber being designated generally by 210.

From FIG. 7 there can be seen once again the radial profile formations 218 on the mass ring 214. The rubber-elastic spring elements 216 and the stop bodies 220 are arranged in the recesses 218b of the radial profile formations 218. The essential difference between the third embodiment and the above-described embodiments of the invention consists in that the elastomeric damping layer 226 in the region of the radial sections 218a of the radial profile formations 218 is provided with the sliding bodies 230, which are only vaguely discernible in FIG. 7.

In certain cases of application, for example where there are very high rotational-speed requirements, it may be useful to avoid direct contact between the elastomeric damping layer 226 and the inner carrier 212 and instead attach sliding bodies 230 to the radial sections 218a of the radial profile formations 218. The sliding bodies 230, as well as the radial sections 218a, are arranged offset from one another at regular angular distances, i.e. in this embodiment by 60°. The radial stiffness of the vibration absorber 210 can be further increased by the sliding blocks or the sliding body 230, since the elastomeric damping layer 226 is designed relatively thin in the region of the sliding blocks 230 and thus only small displacements in the radial direction of the mass ring 214 relative to the axis of rotation of the vibration absorber 210 are possible.

FIG. 8 shows once again a front view of the vibration absorber 210 and FIG. 9 shows a sectional view along the section line VIII-VIII from FIG. 8.

On comparative consideration of FIGS. 8 and 9, the sliding bodies 230, via which the mass ring 214 is now supported on the inner carrier 212, can be clearly seen. The sliding bodies 230 are fastened to the elastomeric damping layer 226, for example are vulcanised onto it. In other words, the sliding bodies 230 lie on the outer circumferential surface 213 of the inner carrier 212, but can be displaced relative to or slide on this surface during the operation of the vibration absorber 210.

Figure 10:
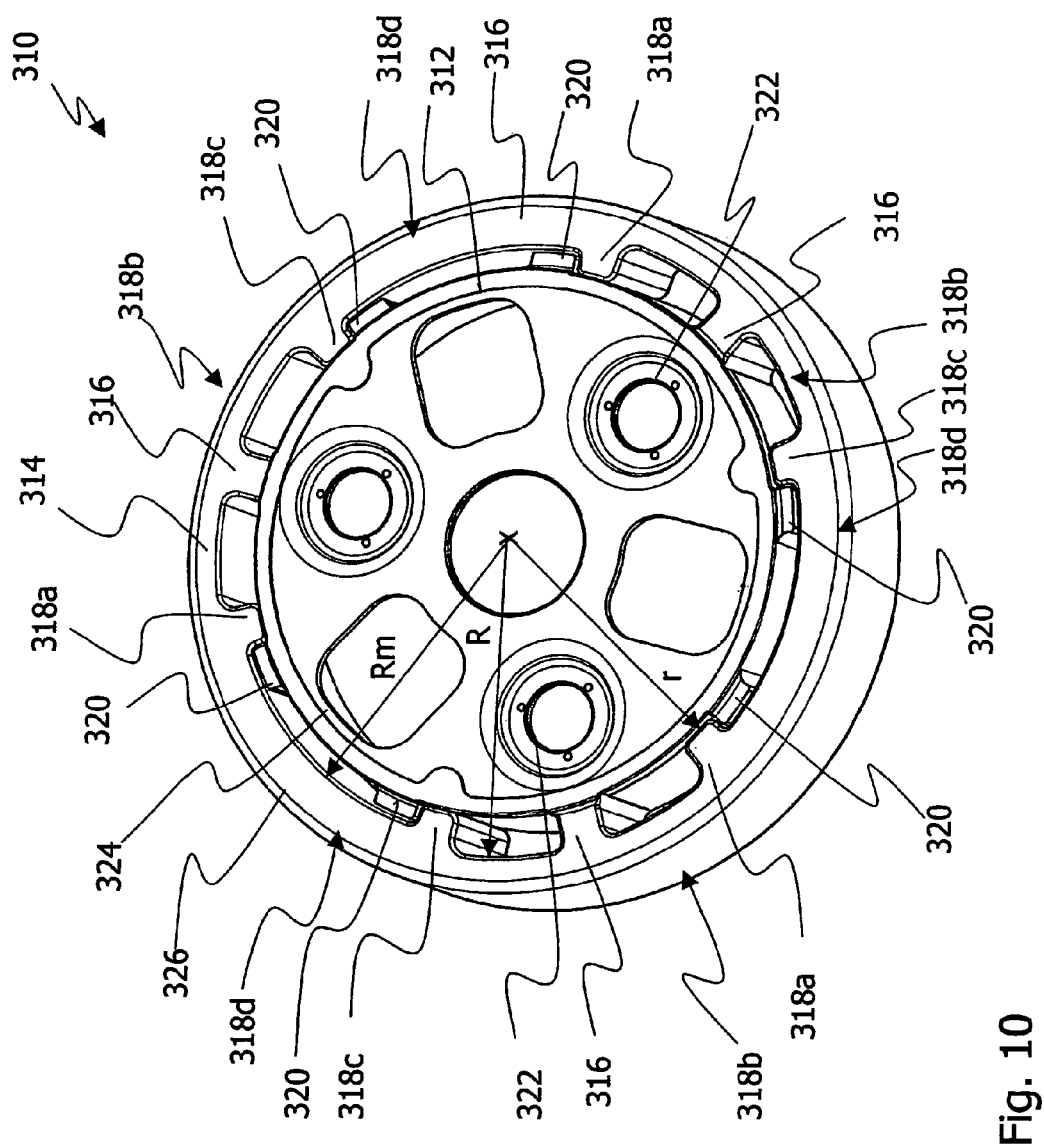
FIG. 10 shows a perspective view of a vibration absorber according to a fourth embodiment of the invention.

FIG. 10 shows a perspective view of a fourth embodiment of the invention, in which a radial profile formation 318 of the mass ring 314 is formed from two radial sections 318a, 318c, a recess 318b, in which the spring elements 316 are arranged, and a recess 318c receiving the stop bodies 320 on the outer circumferential surface 313 of the inner carrier 312. The radial sections 318a, 318c are offset from one another by 60° in each case and a radial profile formation occupies a circular ring section of 120°.

From FIG. 11 it can be seen how the radial sections 318a, 318c of the radial profile formations 318 cooperate with the stop bodies 320 on the inner carrier 312 which are received in the recess 318c. The stop bodies 320 lie in each case against a radial section 318a of the radial profile formations 318. The recesses 318b and 318c extend in the radial direction to different degrees into the mass ring 314. In other words, the mass ring 314 has three different inner radii, r, Rm, R, the smallest inner radius r being determined by the radial sections 318a of the radial profile formations 318. In each case two stop bodies 320 of the inner carrier 312 are received in a recess 318c and lie in each case against the radial sections 318a of adjacent radial profile formations 318. The spring elements 316 are arranged in the recess 318b extending farthest in the radial direction into the mass ring 314.

FIG. 12 shows a sectional view along the section line XI-XI from FIG. 11. It can be seen from FIG. 12 how the spring elements 316 connect the inner carrier 312 or its outer circumferential surface 312a to the mass ring 314.

FIG. 12 furthermore shows a distance in the radial direction between the inner carrier 312 and the mass ring 314, which is formed by the recess 318c of the radial profile formations 318 of the mass ring 314. In this embodiment of the invention, the spring elements 316 are formed integrally with the elastomeric damping layer 326.

As can be seen from FIGS. 10 to 12, the mass ring 314 is supported on the inner carrier 312 via the radial sections 318a or the elastomeric damping layer 326 on the radial sections 318a, the radial sections 318a sliding on the outer circumferential surface 312a of the inner carrier 312 upon a relative rotation between the mass ring 314 and the inner carrier 312 which occurs during operation.

As already mentioned, the amplitude, i.e. the maximum permissible relative rotation between the inner carrier 312 and the mass ring 314, is determined by the radial sections 318a of the radial profile formations 318 of the mass ring 314 which cooperate with the stop bodies on the inner carrier. In particular from FIG. 11 it can be seen that only relatively small amplitudes between the inner carrier 312 and the mass ring 314 can be realised with the vibration absorber 310 according to this embodiment of the invention.

Figure 13:
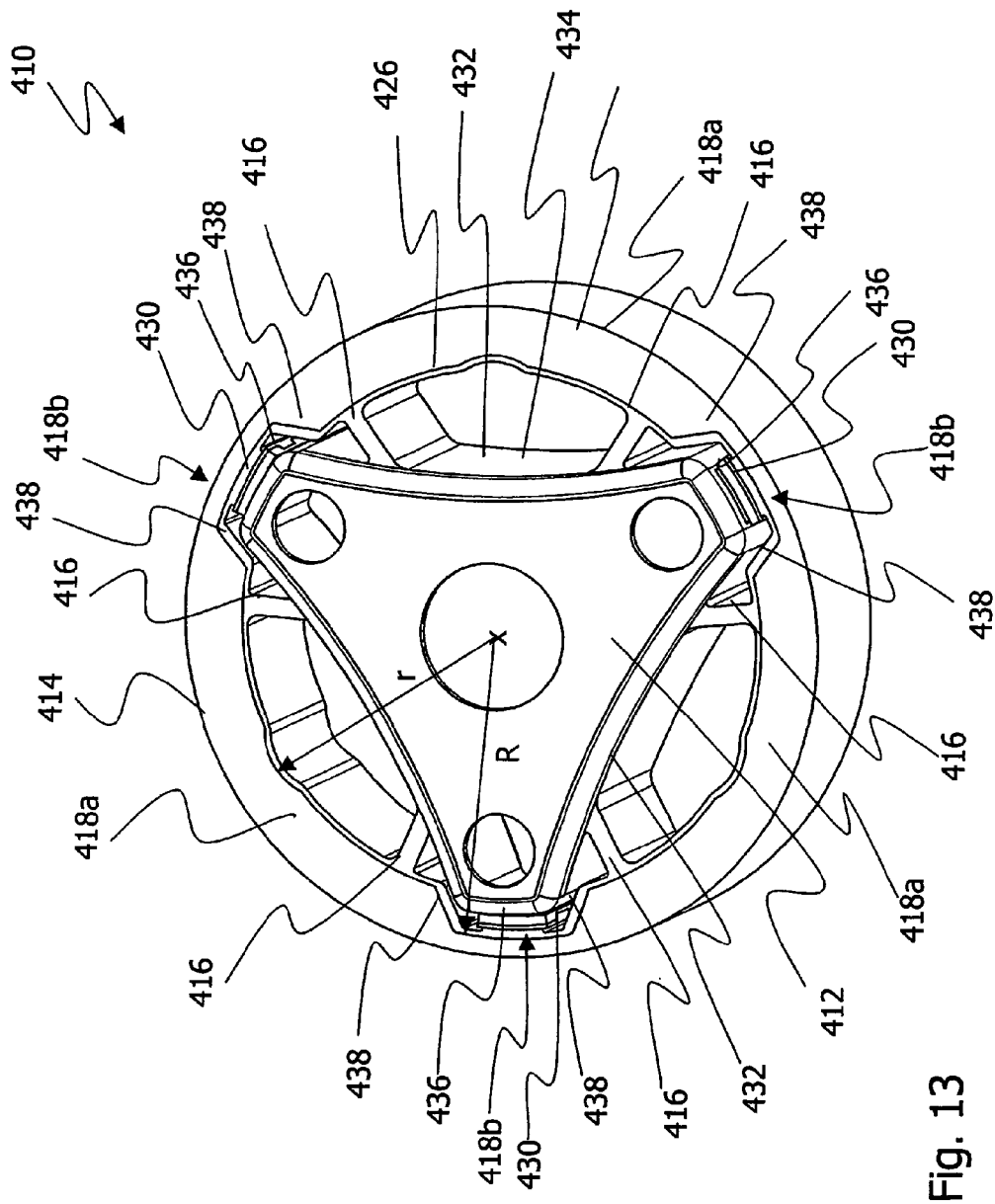
FIG. 13 shows a perspective view of a vibration absorber according to a fifth embodiment of the invention.

FIG. 13 shows a perspective view of a vibration absorber 410 according to a fifth embodiment of the invention.

The inner carrier 412 is designed here substantially in the form of a perforated triangle, with circumferential surfaces 432 of the inner carrier 412 being rounded. The mass ring 414 once again has radial profile formations 418 with a radial section 418a and a recess 418b. The inner carrier 412 and the mass ring 414 are connected via spring elements 416 as in the above-described exemplary embodiments. The spring elements 416 extend web-like between the inner carrier 412 and the mass ring 414, however in this embodiment, in contrast to the above-described embodiments, are not provided in the recess 418b, but extend obliquely between the radial sections 418a and the circumferential surfaces 432 of the inner carrier 412. The recesses 418b are arranged offset by 120° from one another and a radial profile formation 418 occupies a circular ring section of 120°.

Furthermore, there can be seen on the mass ring 414 the elastomeric damping layer 426, which is formed integrally with the spring elements 416. The elastomeric damping layer 426 has a sliding body 430 in the region of the recess 418b of the radial profile formations 418. On its circumferential surfaces 432, the inner carrier 412 likewise has a damping layer 434, which is connected to a sliding body 436. The sliding bodies 430 of the mass ring 414 and the sliding bodies 436 on the inner carrier 412 are arranged in such a manner that they correspond to one another. In other words, the sliding bodies 430, 436 slide on one another upon a relative rotation between the inner carrier 412 and the mass ring 414. The sliding bodies 430, 436 are arranged offset by 120° from one another in the recesses 418b.

Furthermore, it can be seen from FIG. 13 that the inner carrier 412 projects into the recess 418b, whereby the side walls 438 of the recess 418b serve as a stop for the inner carrier 412 in the circumferential direction, in order to limit a relative rotation between the inner carrier 412 and the mass ring 414. In other words, the inner carrier 412 strikes against the side walls 438 of the recess 418b after the maximum permissible amplitude between the inner carrier 412 and the mass ring 414.

FIG. 14 shows a front view of the vibration absorber 410 according to the fifth embodiment of the invention. The mass ring 414 has the elastomeric damping layer 426 which is provided, in the region of the recess 418b, with a sliding body 430 and is formed integrally with the spring elements 416.

From FIG. 14 it can be clearly seen that the inner carrier 412 comprises the basic shape of a triangle and on its circumferential surfaces 432 sliding bodies 436 fastened to it, likewise via the damping layer 434.

On comparative consideration of FIG. 14 with FIG. 15, which illustrates a sectional view along the section line XIV-XIV from FIG. 14, it can be seen that the inner carrier 412 or its circumferential surfaces 432 are covered with the elastomeric damping layer 434.

In addition, from the sectional view FIG. 15 there can be seen correspondingly formed sliding bodies 430 and 436 which are formed with corresponding guideways 430a, 430b, 430c and 436a, 436b engaging in one another. This results in a rail-like guiding structure, with the sliding bodies 430 which engage in one another enabling the sliding movement to be guided both in the circumferential direction and in the axial direction of the centre axis M of the vibration absorber 410 upon a relative rotation between the mass ring 414 and the inner carrier 412. As a result, the axial resonant frequency of the vibration absorber can be decoupled from its torsional resonant frequency. In other words, the axial degree of freedom of the vibration absorber can be eliminated by the guideways 430a, 430b, and 436a, 436b and 436c of the guiding blocks 430, 436 respectively, whereby the vibration absorber 410 can be tuned to torsional vibrations independently of axial deflections.

FIGS. 16a and 16b show perspective illustrations of the sliding bodies 430 and 436, FIG. 16a illustrating the two sliding bodies 430 and 436 separated from one another and FIG. 16b showing the two sliding bodies 430, 436 in engagement with one another, as is the case in a state when installed in the torsional vibration absorber 410.

In FIG. 16*a* there can be seen the guideways 430*a*, 430*b*, 430*c* and 436*a*, 436*b* of the sliding bodies 430 and 436, via which the two sliding bodies 430, 436 can engage in one another (FIG. 16*b*).

If the two sliding bodies 430, 436 are in engagement with one another, as shown in FIG. 16*b*, they can slide on one another during the operation of the torsional vibration absorber 410 (FIGS. 13-15), and thus allow a relative rotation between the mass ring 414 and the inner carrier 412 in the circumferential direction and in doing so at the same time virtually eliminate the axial degree of freedom of the mass ring 414 owing to their the guideways 430*a*, 430*b*, 430*c* and 436*a*, 436*b* running in the circumferential direction of the torsional vibration absorber 410, whereby the vibration absorber 410 can be tuned to torsional vibrations independently of axial deflections.

The invention claimed is:

1. A vibration absorber for a drive train of a motor vehicle, comprising:
    an inner carrier which is rotatable about an axis of rotation;
    a mass ring which is coaxial with the inner carrier and is arranged at a radial distance from the inner carrier;
    a plurality of spring elements which connect the inner carrier and the mass ring to one another;
    at least one radial profile formation on an inner circumferential surface of the mass ring for sliding support in a circumferential direction on the inner carrier, the at least one radial profile formation including a radial section and a recess integrally formed on the mass ring and in the radial direction of the mass ring; and
    an elastomeric damping layer arranged between the inner carrier and the mass ring such that the elastomeric damping layer slides at least in the region of the at least one radial profile formation in the circumferential direction on the inner carrier upon a relative rotation.

2. The vibration absorber according to claim 1, wherein the inner carrier includes, at least in sections, an elastomeric damping layer, such that at least one sliding body is attached to the inner carrier.

3. The vibration absorber according to claim 2, wherein the at least one sliding body is arranged in such a manner on the inner carrier that it is in engagement with the at least one sliding body on the radial profile formations of the mass ring.

4. The vibration absorber according to claim 2, wherein the at least one sliding body of the mass ring and of the inner carrier includes guideways running in the circumferential direction of the vibration absorber, and the guideways of the sliding bodies of the mass ring and of the inner carrier being correspondingly formed and engaging in one another.

5. The vibration absorber according to claim 1, wherein there being provided, at least on an outer circumferential surface of the inner carrier, at least one stop body projecting radially outwards from the outer circumferential surface.

6. The vibration absorber according to claim 5, further comprising a plurality of stop bodies being arranged at regular angular distances about the axis of rotation.

7. The vibration absorber according to claim 6, wherein the stop bodies cooperate with the radial profile formation provided on the inner circumferential surface of the mass ring, in order to limit the rotation of the mass ring relative to the inner ring.

8. The vibration absorber according to claim 1, wherein the radial profile formations are offset from one another by a predetermined angle with respect to the axis of rotation of the vibration absorber.

9. The vibration absorber according to claim 8, wherein the predetermined angle is an angle between 60° and 120°.

10. The vibration absorber according to claim 1, wherein the spring elements are offset from one another by a predetermined angle with respect to the axis of rotation of the vibration absorber.

11. The vibration absorber according to claim 10, wherein the predetermined angle is an angle between 30° and 90°.

12. The vibration absorber according to claim 1, wherein the spring elements for connecting the inner carrier to the mass ring is formed from an elastic material and connects the inner carrier to the mass ring in a web-like manner.

13. The vibration absorber according to claim 12, wherein the spring elements extend substantially in the radial direction.

14. The vibration absorber according to claim 1, wherein the at least one radial profile formation extends in a direction of the inner carrier.

15. The vibration absorber according to claim 1, wherein the inner carrier includes a sliding surface, on which the elastomeric damping layer of the mass ring lies.

16. The vibration absorber according to claim 1, wherein each radial profile formation is assigned at least one sliding body which is fastened to the radial profile formation by the elastomeric damping layer and lies on a sliding surface of the inner carrier.

17. The vibration absorber according to claim 1, wherein the elastomeric damping layer completely surrounds the mass ring.

18. The vibration absorber according to claim 1, wherein the elastomeric damping layer is formed integrally with the spring elements.

19. A drive train for a motor vehicle having a vibration absorber according to claim 1.

* * * * *